(12) United States Patent
Ma et al.

(10) Patent No.: US 11,320,996 B2
(45) Date of Patent: May 3, 2022

(54) METHODS, APPARATUSES AND COMPUTER PROGRAM PRODUCTS FOR REALLOCATING RESOURCE IN A DISK SYSTEM

(71) Applicant: EMC IP Holding Company LLC, Hopkinton, MA (US)

(72) Inventors: Chun Ma, Beijing (CN); Shaoqin Gong, Beijing (CN); Haiying Tang, Beijing (CN); Tianshu Sun, Beijing (CN); Zhihui Qiu, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 47 days.

(21) Appl. No.: 16/575,475

(22) Filed: Sep. 19, 2019

(65) Prior Publication Data
US 2020/0133535 A1    Apr. 30, 2020

(30) Foreign Application Priority Data
Oct. 31, 2018    (CN) .......................... 201811291316.5

(51) Int. Cl.
*G06F 3/06* (2006.01)
*G11B 20/10* (2006.01)
*G06F 17/11* (2006.01)

(52) U.S. Cl.
CPC .......... *G06F 3/0631* (2013.01); *G06F 3/0604* (2013.01); *G06F 3/0616* (2013.01); *G06F 3/0674* (2013.01); *G11B 20/10* (2013.01); *G06F 17/11* (2013.01)

(58) Field of Classification Search
CPC .... G06F 3/0604; G06F 3/0616; G06F 3/0631; G06F 3/0674; G06F 17/11; G11B 20/10
See application file for complete search history.

(56) References Cited

U.S. PATENT DOCUMENTS

| | | | |
|---|---|---|---|
| 9,135,160 B1 * | 9/2015 | Zheng | G06F 3/0679 |
| 9,940,033 B1 | 4/2018 | Alshawabkeh et al. | |
| 10,078,569 B1 | 9/2018 | Alshawabkeh et al. | |
| 10,254,970 B1 | 4/2019 | Martin et al. | |
| 10,521,302 B1 | 12/2019 | Gao et al. | |
| 10,642,505 B1 * | 5/2020 | Kuzmin | G06F 3/0685 |
| 10,809,931 B1 | 10/2020 | Martin et al. | |

(Continued)

*Primary Examiner* — Yaima Rigol
(74) *Attorney, Agent, or Firm* — BainwoodHuang

(57) ABSTRACT

Techniques perform resource reallocation for a disk system. Such techniques involve: determining, based on conditions of allocated disk extents in a plurality of disks and wear levels of the plurality of disks, an enhanced neighbor matrix characterizing both distribution evenness of the disk extents on the plurality of disks and the wear levels of the plurality of disks; and performing a resource reallocation operation on the plurality of disks based on the enhanced neighbor matrix. Accordingly, it is possible to, through the enhanced neighbor matrix that is based on the wear level, simultaneously consider both the distribution evenness of disk extents and the wear level of the disk while performing resource reallocation, thereby avoiding the problem of ping-pang resource reallocation caused by inconsistent standards between different resource reallocation methods, and having good compatibility with existing storage systems.

25 Claims, 14 Drawing Sheets

(56) References Cited

U.S. PATENT DOCUMENTS

| | | | |
|---|---|---|---|
| 2016/0034208 A1* | 2/2016 | Cepulis | G06Q 30/0631 705/26.7 |
| 2016/0239420 A1* | 8/2016 | Agarwal | G06F 12/0871 |
| 2017/0192695 A1* | 7/2017 | Xu | G06F 3/0631 |
| 2017/0212705 A1* | 7/2017 | Kidney | G06F 3/067 |
| 2019/0220212 A1* | 7/2019 | Xu | G06F 11/1076 |
| 2019/0220357 A1* | 7/2019 | Han | G06F 3/0619 |

\* cited by examiner

```
                     NEIGHBORHOOD
                        MATRIX
        D0  D1  D2  D3  D4  D5  D6  D7  D8  D9
    D0  000,004,004,004,005,004,003,004,000,000,
    D1  004,000,004,004,004,004,004,004,000,000,
    D2  004,004,000,004,004,004,003,005,000,000,
    D3  004,004,004,000,004,004,004,004,000,000,
    D4  005,004,004,004,000,004,003,004,000,000,
    D5  004,004,004,004,004,000,004,004,000,000,
    D6  003,004,003,004,003,004,000,003,000,000,
    D7  004,004,005,004,004,004,003,000,000,000,
    D8  000,000,000,000,000,000,000,000,000,000,
    D9  000,000,000,000,000,000,000,000,000,000,
```

EXAMPLE OF EVEN DISTRIBUTION

```
 0  19  21  20  20  19  20  20  19  19
19   0  20  19  19  19  19  20  19  20
21  20   0  20  19  20  20  20  20  19
20  19  20   0  19  19  20  20  19  20
20  19  19 (19)  0  20  20  20  20  19
19  19  20  19 (20)  0  20  19  20  19
20  19  20  20  20   0  20  20  19
20  20  20  20  20  19  20   0  19  19
19  19  20  19  20  20  20  19   0  19
19  20  19  20  19  19  19  19  19   0
```

EXAMPLE OF UNEVEN DISTRIBUTION

FIG. 10D

METHODS, APPARATUSES AND COMPUTER PROGRAM PRODUCTS FOR REALLOCATING RESOURCE IN A DISK SYSTEM

CROSS-REFERENCE TO RELATED APPLICATION

This application claims priority to Chinese Patent Application No. CN201811291316.5, on file at the China National Intellectual Property Administration (CNIPA), having a filing date of Oct. 31, 2018, and having "METHODS, APPARATUSES AND COMPUTER PROGRAM PRODUCTS FOR REALLOCATING RESOURCE IN A DISK SYSTEM" as a title, the contents and teachings of which are herein incorporated by reference in their entirety.

FIELD

Some embodiments of the present disclosure relate to the field of data storage, and more specifically to methods, apparatuses, and computer program products for reallocating resources in a disk system.

BACKGROUND

A storage system may be built based on one or more physical storage devices to provide the ability to store data. In the storage system, each physical storage device is divided into several disk extents of the same size. When a user creates a mapped Redundant Array of Independent Drives (RAID), the disk extents are evenly selected from all disks to compose a newly-created RAID extent of the mapped RAID. A mapped RAID may include multiple RAID extents. When the RAID extents are formed, this even allocation of disk extents may ensure that user data can make full use of the high performance of parallel input/output (I/O) processing of all disks in an extent pool.

Besides the performance concern, it is also possible to achieve excellent behavior in rebuilding by distributing disk extents evenly to all disks. Since RAID extents locate on disks evenly, if one of the disks failed, all or most other good disks will participate in parallel rebuilding lost data of each RAID extent. Hence, this will make the rebuilding speed much faster than traditional RAID. In fact, most of the advantages associated with mapped RAID originate from the property of the even distribution of disk extents.

Usually, a neighborhood matrix may be used to characterize the even distribution of disk extents. Elements of the neighborhood matrix represent the number of times that disk extents in respective disks are simultaneously contained in one RAID extent. So if the disk extents of all the disks in the storage resource pool are evenly distributed, values of the respective elements in the neighborhood matrix should be very close. Therefore, it is possible to evaluate whether the disk extents are evenly distributed by observing differences among the values of the respective elements in the neighborhood matrix. If the evaluation result is that the disk extents are not evenly distributed, that is, in the case where differences among the values of the elements in the neighborhood matrix are large, the disk extents may be reallocated by the shuffling operation to improve the even distribution of the disk extents. The shuffling operation may improve the even distribution of the disk extents by reallocating the disk extents of the disk corresponding to the highest value in the neighborhood matrix, with the goal of balancing the disk consumption capacity and the disk allocation of the disk extents.

In addition, in mapped RAID, there's another disk reallocation operation for load and wear level balance, which is directed to balance user IO load and wear level among all disks in an extent pool. However, in some cases, the load and wear level balancing method cannot balance the disk extents of all disks very well. It may be supposed that there is only one hot disk extent of one hot disk. A new hot disk will always appear regardless of which disk is running the hot disk extent. The existing balancing method cannot solve this problem. The current processing is to send a balance request to a fine-grained load balancing module in these cases to balance the load with the slice granularity.

Fine-grained load balancing technology is another load balancing method that moves slices based on drive I/O load and disk wear level. The fine-grained load balancing module communicates with a user logic unit driver to obtain pool and layer configurations and collect I/O statistics information of the slices. Then, based on the collected I/O statistics information and disk wear levels, it is calculated how to relocate the slices. Next, when the user logic unit driver performs slice relocation, the fine-grained load balancing module sends a slice relocation request to the user logic unit driver and queries for the state when performing user logical unit relocation.

However, since these disk reallocation load balancing operations are performed based on different criteria and rules, there might be ping-pang reallocation of disk extents between the shuffling operation and load and disk wear level balancing operation.

SUMMARY

In some embodiments of the present disclosure, there is provided a technical solution for performing resource reallocation for a disk system.

In a first aspect of the present disclosure, there is provided a method for performing resource reallocation for a disk system. This method can be performed at a virtual machine server. The method includes: determining, based on conditions of allocated disk extents in a plurality of disks and wear levels of the plurality of disks, an enhanced neighbor matrix characterizing both distribution evenness of the disk extents on the plurality of disks and the wear levels of the plurality of disks; and performing a resource reallocation operation on the plurality of disks based on the enhanced neighbor matrix.

In a second aspect of the present disclosure, there is provided an apparatus for performing resource reallocation for a disk system. The apparatus includes: a processor; and a memory coupled to the processor, the memory having instructions stored therein, which, when executed by the processor, causes the apparatus to: determine, based on conditions of allocated disk extents in a plurality of disks and wear levels of the plurality of disks, an enhanced neighbor matrix characterizing both distribution evenness of the disk extents on the plurality of disks and the wear levels of the plurality of disks; and perform a resource reallocation operation on the plurality of disks based on the enhanced neighbor matrix.

In a third aspect of the present disclosure, there is provided a computer program product tangibly stored on a computer readable medium and including machine executable instructions, the machine executable instructions, when executed, causing a machine to perform acts in the method of the first aspect of the present disclosure.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The above and other objectives, features, and advantages of example embodiments of the present disclosure will become more apparent from the following detailed description with reference to the accompanying drawings, in which the same reference symbols refer to the same elements in example embodiments of the present disclosure.

FIG. 10A-FIG. 10E illustrate an example process of a resource reallocation operation according to some embodiments of the present disclosure;

DETAILED DESCRIPTION OF EMBODIMENTS

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

The principles of the present disclosure are described below with reference to several example embodiments illustrated in the figures. Although preferred embodiments of the present disclosure are illustrated in the figures, it should be appreciated that these embodiments are described only to enable those skilled in the art to better understand and thereby implement the present disclosure, not to limit the scope of the present disclosure in any manner.

As used herein, the term "include(s)/comprise(s)" and its variants are to be read as open-ended terms that mean "include(s)/comprise(s), but is not limited to." The term "or" is to be read as "and/or" unless the context clearly indicates otherwise. The term "based on" is to be read as "based at least in part on." The term "one example implementation" and "an example implementation" are to be read as "at least one example implementation." The term "another implementation" is to be read as "at least one other implementation." Terms "a first", "a second" and others can denote different or identical objects. The following text may also contain other explicit or implicit definitions.

Figure 1:
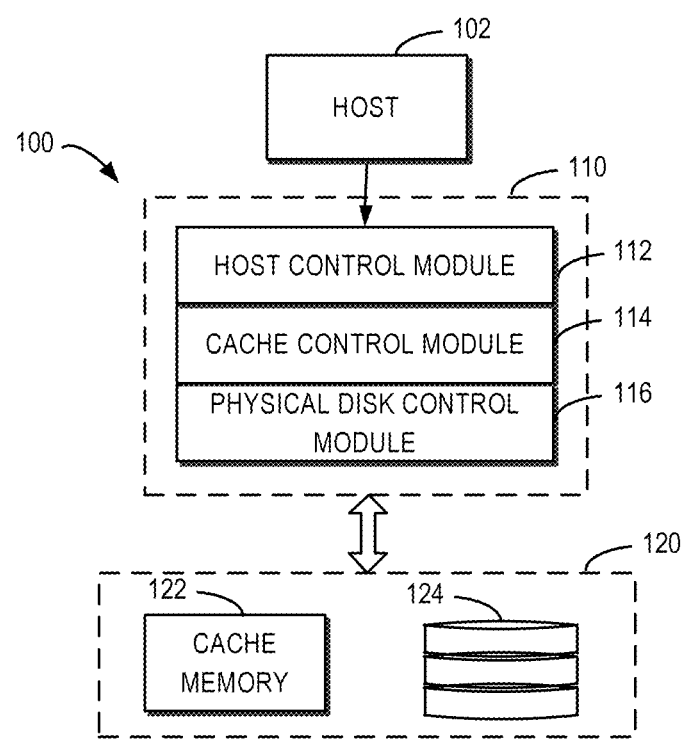
FIG. 1 illustrates a schematic diagram of an example environment in which some embodiments of the present disclosure may be implemented.

Reference is first made to FIG. 1, which shows a schematic diagram of an example environment in which the technical solutions of embodiments of the present disclosure can be implemented. The storage system 100 includes a physical storage device group 120 for providing a data storage capability. The physical storage device group 120 includes a cache memory 122 and a disk device 124. The cache memory 122 is used for data caching, and the disk device 124 is used for persistent storage of data. Generally, an access speed of the cache memory 122 is greater than that of the hard disk device 124. The storage system 100 may utilize a variety of storage technologies to provide the data storage capability.

In some embodiments, examples of the cache memory 122 include memories with a higher access speed, such as caches, random access memory (RAM), and dynamic random access memory (DRAM). Examples of the disk device 124 may include Redundant Arrays of Independent Drives (RAID) or other disk devices.

To manage data storage for physical storage space, the storage system 100 further includes a storage controller 110. Usually, the storage system 100 employs a hierarchical control model. As illustrated in FIG. 1, under the hierarchical control model, the storage controller 110 may have multiple layers of control modules, including a host control module 112, a cache control module 114, and a physical disk control module 116. These control modules implement hierarchical control functions.

To facilitate understanding of the hierarchical control model of the storage system 100, the operation mechanism of the controller 110 is described in an example using the RAID technology. The physical disk control module 116 presents a logical unit number (LUN) device to the cache control module 114. The physical disk control module 116 controls the storage space of the disk device 124. The cache control module 114 controls the cache space of the cache memory 122 to present a cache volume to the host control module 112. The host control module 12 manages a logical storage pool and presents the pool LUN to the host 102.

Upon operation, an application running on the host 102 may send a user write request to the host control module 112 to request to write data to the storage system 100. In response to the received user write request, the host control module 112 may generate multiple write requests for the cache control module 114. For example, if a user write request of the host 102 requires writing a large amount of data into multiple discrete extents of a RAID LUN created by the hard disk device 124, the host control module 112 sends a write request to the cache control module 114 for each extent.

The cache control module 114 and the cache memory 122 operate in a write-back mode. This means that upon receipt of the write request, the cache control module 114 first caches the data to be written by the write request into the cache memory 122, and then releases the data of the write request(s) to the disk device 124. The cache control module 114 may send an indication of completion of the write request to the host control module 112 after the data caching is completed, thereby enabling a fast response to the user write request. The physical disk control module 116 is used to control an actual write to the hard disk device 124.

It should be understood that although the host control module 112, the cache control module 114 and the physical disk control module 116 are illustrated above as different modules, they may be implemented by a single or multiple processors, controllers, microprocessors having a processing capability or a computing device including these devices. In some examples, the cache control module 114 may further be integrated with the cache memory 122 to obtain a device with both caching and controlling capabilities. Although not shown, in some embodiments, the storage system 100 may further include another storage controller as a mirror of the storage controller 100 to provide data consistency, security, and data recovery capability. In some examples, the storage system 100 may also use a multi-core storage mechanism to implement data storage and management.

Figure 2:
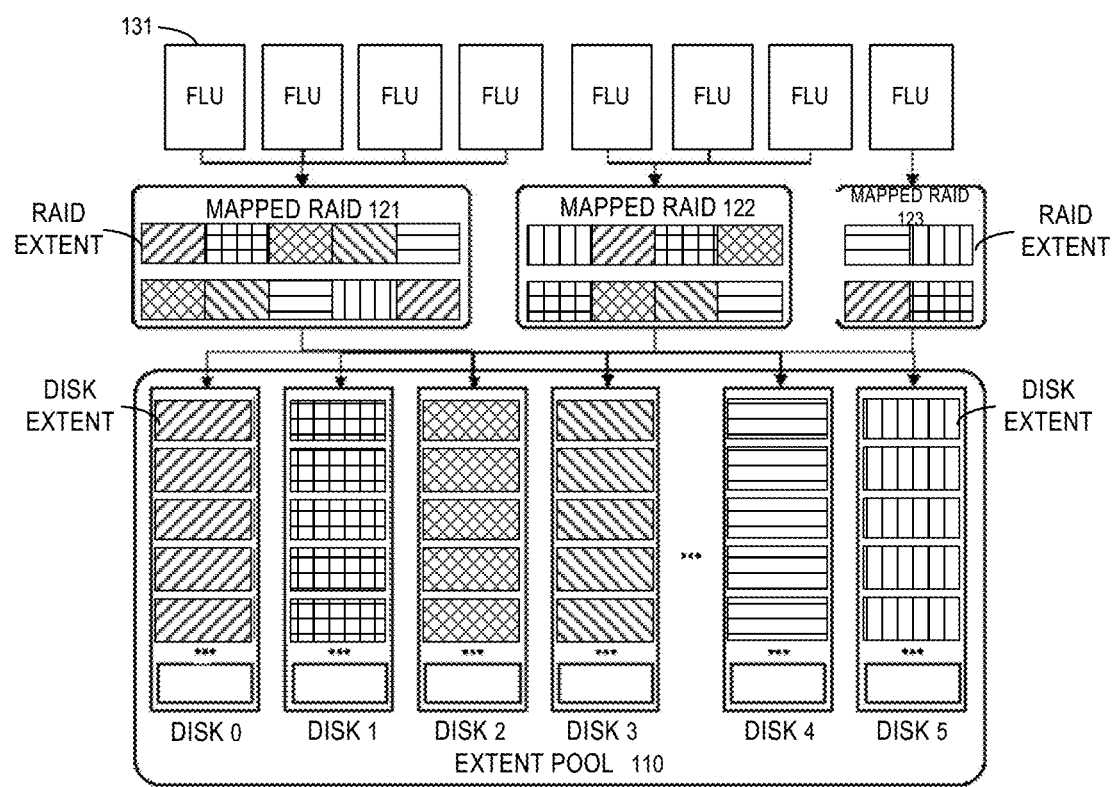
FIG. 2 illustrates a method of allocating disk extents in the prior art.

For illustration purpose below, reference will be first made to FIG. 2 to describe a disk extent allocation method in the prior art. As illustrated in FIG. 2, in the storage system, each of the example disks 0 to 5 is divided into a plurality of disk extents, and the disk extents are placed in the extent pool 110 for management. A RAID extent is formed by evenly selecting disk extents from each disk, and mapped RAIDs 121 to 123 are composed by a plurality of RAID extents. Based on the respective mapped RAIDs, it is possible to form various internal logic units 131 for use by higher-level users.

Due to factors such as high performance of parallel I/O processing and good performance of data reconstruction, even distribution is one of principal principles of disk extent allocation. In order to evaluate the distribution evenness of the disk extents, a Neighbor Matrix NM may be used to characterize the evenness. The neighbor matrix is an n*n square matrix, wherein n denotes the number of disks in the extent pool. Each element in the matrix NM may be represented as NM(i,j), which represents the number of times that disk i is neighboring to disk j. According to the definition of NM, disks to which all disk extents in a RAID extent belong are disks that are neighboring to each other. The neighbor matrix is a symmetric matrix with diagonal elements of zero. Since according to the definition of "neighbor", in the case that i≠j, a value of NM(i,j) should be equal to the value of NM(j,i), and in the case that i=j, NM(i,j) is always zero.

Figures 3, 4A:
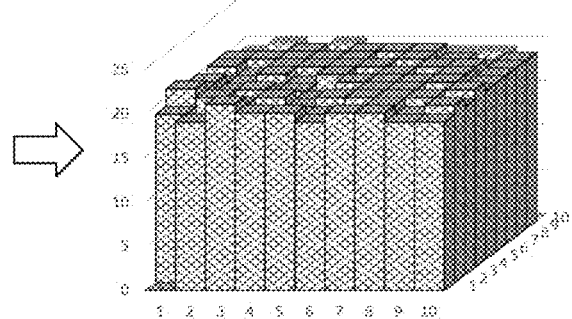
FIG. 3 illustrates an example of a neighborhood matrix for an extent pool with 10 disks.
FIG. 4A and FIG. 4B illustrate scenarios in which disk extents are evenly and unevenly distributed and their corresponding neighboring matrices.

For purposes of illustration, FIG. 3 shows an example of a neighbor matrix of an extent pool having 10 disks. Since 10 disks are involved, the neighbor matrix is a 10×10 square matrix, where each value in the matrix represents the number of times that disk extents of two disks i, j are in the same RAID extent. If the disk extents used by RAID are evenly distributed on all disks in the extent pool, values in the neighbor matrix other than the value at the diagonal should be substantially close. Therefore, it is possible to evaluate whether the disk extents are evenly distributed by observing the magnitude of the difference among the values of the neighbor matrix.

Figure 4B:
Figure 4B:
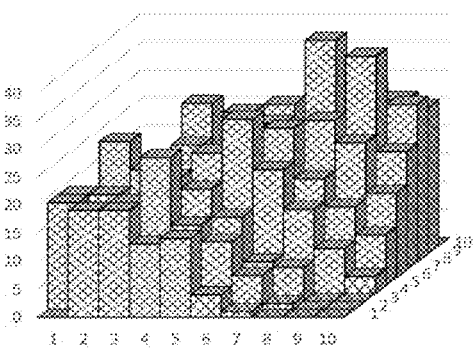

FIG. 4A and FIG. 4B illustrate scenarios in which disk extents are evenly and unevenly distributed and their corresponding neighbor matrices. As can be seen from the scenario illustrated in FIG. 4A, the disk extents are substantially evenly distributed on the respective disks; in the corresponding neighbor matrix, the number of times that disks are neighboring to each other is substantially 19 and 20. In contrast, in the scenario illustrated in FIG. 4B, conditions of the disk extents among respective disks differ greatly, and they are not evenly distributed; in the corresponding neighbor matrix, the number of times that some disks are neighboring to one another is as high as 38, and the number of times that other disks are neighboring to one another is as low as 1, or even 0.

As stated above, for the case where the disk extents are unevenly distributed, the disk extent reallocation may be performed by the shuffling operation. The function of the shuffling operation is to balance the disk extent distribution of the extent pool by reallocating the disk extents in a disk with a higher value in the neighbor matrix. The process of the existing shuffling operation will be briefly described below for illustrative purposes.

For an extent pool containing n disks (d1, d2, . . . dn), disks i and j corresponding to the element NM(i,j) with a maximum value in the corresponding neighbor matrix are usually first selected. If there are multiple maximum values, one of them may be selected randomly. Then, within the mapped RAID extent, a mapped RAID extent (RE) set is found, each element re (RAID extent) in the RE set including both disk extents of disk i and disk extents of disk j. Or in other words, in the re, there is a disk extent of disk i at one location and there is a disk extent of disk j at another location. Then, for each re in the RE set, candidate target disks k are searched, wherein the sum of the NM(k, x) of the candidate target disks k is smaller than the sum of NM(i, x) or NM(j, x), wherein x is the disk number other than i, j, k in re. This means that the target disks need to be able to improve the evenness of the disk extent distribution. Further, for each re, the disk extent movement from the source disk i or j to the candidate target disk k is recorded as a valid movement. If no candidate target disk is found, the shuffling operation ends. If there is a candidate target disk, the valid disk extent that can cause the greatest performance improvement is determined from the corresponding valid disk extent movement. Then, the disk extents in re may be moved from the source disk to the target disk according to a final result.

In the mapped RAID, it is also possible to perform a reallocation operation for load balancing. For example, a disk redistribution operation based on load level and wear level may be performed to balance user I/O load and wear levels among all disks in the extent pool. To quantify the I/O load level and wear level of disk extents and disks, load temperature and wear temperature are defined to characterize the I/O load level and wear level. The load temperature of a disk is defined as a sum of the load temperature of all disk extents in the disk; the wear temperature of the disk is defined as a sum of the wear temperature of all disk extents in the disk. The load temperature and wear temperature of each disk extent may be calculated based on Equation 1 below, but the wear temperature of a disk extent is calculated based on the total I/O block count of disk extents during a sampling period. An example Equation 1 for calculating the load temperature and wear temperature is given below:

$$T = T' * e^{-\alpha \Delta t} + \frac{\Delta H * (1 - e^{-\alpha * \Delta t})}{\alpha * \Delta t}$$

where,

T denotes current computed temperature;

T' denotes previously computed temperature (at Δt time ago);

α denotes a decay factor, which is derived from temperature exponential half-life decay period;

ΔH denotes I/O activities between two sampling time;

Δt denotes difference between previous sampling time and current sampling time.

For the balance based on the load level, a usual operation is to first determine an average disk load temperature and average disk extent count according to the number of disks and the load temperature of all disks and the number of disk extents of respective disks in the extent pool. Then, for each disk i, if the load temperature of the disk is greater than the average disk temperature and its extent count is greater than the average extent allocation count, the disk extent set DES is selected for the disk i, and the disk extent count in the DES is the difference between the allocated extent count of the disk i and the average extent allocation count, and its total load temperature is approximately the difference between the load temperature of the disk and the average disk temperature. If the load temperature of the disk is greater than the average disk temperature but the allocation extent count is less than the average extent allocation count, another disk extent set DES is selected for the disk, and the disk extent count in the DES is the difference between the allocated extent count of the disk and the average extent allocation count, but the load temperature has a minimum value. The determined DES is moved into an extent buffer BUF. If the BUF is not empty, the disk extent movement may be performed from the disk extent with the highest load temperature for the candidate DES in the BUF until the allocated extent count of the target disk is approximately the same as the average distributed extent count, or the load temperature of the target disk is equal to or higher than the average load temperature of the disk; if the allocated extent count of the target disk is still less than the average distributed extent count, it may begin to move the disk extent with a minimum load temperature in the BUF until the allocated extent count of the target disk is equal to the average distributed extent count. In addition, if there are disk i and disk j whose load level exceeds the predetermined load level range (for example, between +10% and −10%), it is possible to select the hottest disk extent in disk i and the coldest disk extent in disk j (they need to satisfy the requirement that the load temperature of the hottest disk extent in disk i is higher than the coldest load temperature of the coldest disk extent in disk j), and exchange data between them until the load level of the two disks is within a predetermined load level range (e.g., between +10% and −10%).

For the wear level balance, a current ideal write temperature of each disk is usually calculated based on the write quota of the disk. If there are disk i and disk j with wear levels exceeding and lower than the predetermined wear level range respectively (for example, between +10% and −10%)), it is possible to select the hottest disk extent in disk i and the coldest disk extent in disk j (they need to meet the requirement that the load temperature of the hottest disk extent in disk i is higher than the coldest load temperature of the coldest disk extent in disk j), and exchange data between them until the load levels of the two disks are within a predetermined wear level range (e.g., between +10% and −10%).

The above-described load balancing operation and shuffling operation based on load level and wear level may solve the problem of imbalance of load level, wear level, consumption capacity, and RAID extent allocation. However, a potential problem is that the load balancing operation and the shuffling operation based on the load and wear level each perform the balancing process based on their own standards and principles. This might cause ping-pang resource reallocation of disk extents between load balancing operation and shuffling operation based on the load and wear level. For example, if the shuffling operation moves a disk extent from the source disk to the target disk to reduce uneven distribution between the disks, the movement of the disk extent may increase the load imbalance since the source disk may be a cold disk and the target disk may be a hot disk. Meanwhile, when the shuffling operation is completed and the load balancing operation based on the load level or the wear level is triggered, the disk extent moved by the shuffling operation may be redistributed again, and this might have an impact on evenness of distribution of the disk extents of the shuffling operation.

Figure 5A:
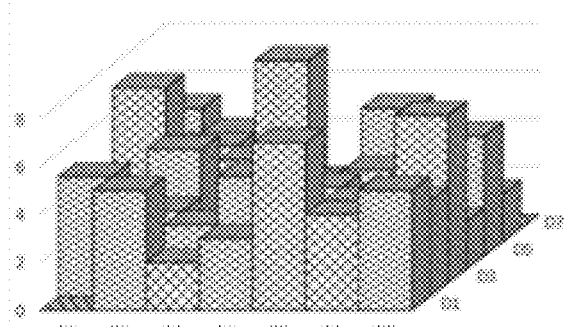
FIG. 5A and FIG. 5B illustrate an example of load temperature imbalance that may be caused by an existing shuffling operation.
Figure 5A:
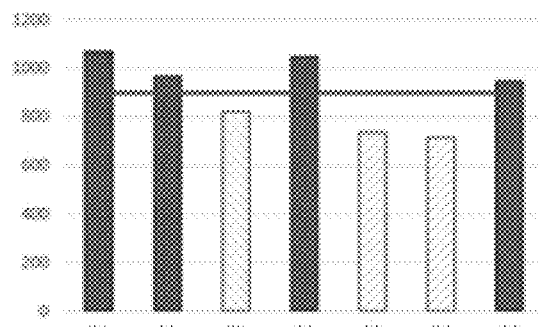
Figure 5B:
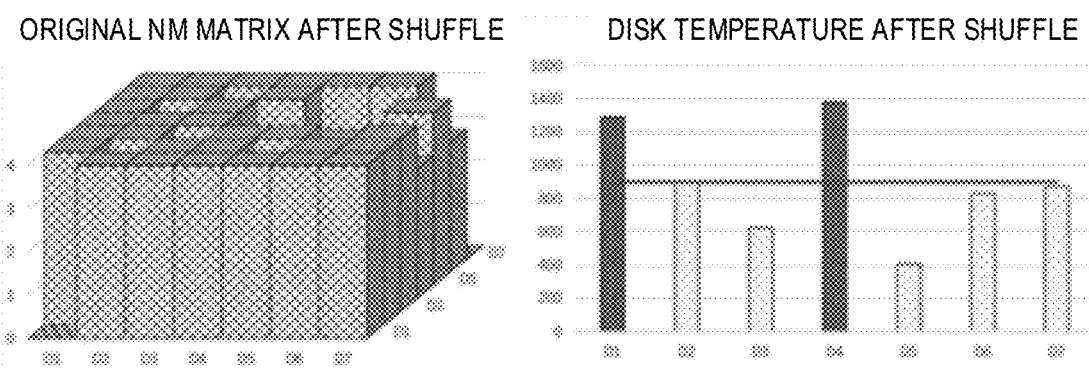

FIG. 5A and FIG. 5B illustrate an example of load temperature imbalance that may be caused by an existing shuffling operation. FIG. 5A shows the neighbor matrix and load temperature of all disks prior to disk operation, wherein the disk extents are unevenly distributed and the disk maximum temperature is less than 1100. After the shuffling operation, it may be seen from the neighbor matrix of FIG. 5B that the distribution evenness of the disks is well improved, but the maximum disk temperature of the original disk becomes higher. Therefore, the shuffling operation increases the load temperature imbalance of the disk. Conversely, when the load balancing operation attempts to balance the disk temperature, the neighborhood matrix will become uneven. At this time, there will be a ping-pang operation.

In an embodiment of the present disclosure, it is possible to simultaneously consider various influencing factors when performing resource reallocation, thereby reducing the likelihood of occurrence of such ping-pang operation. The neighbor matrix value may be adjusted based on the wear level weight to generate an enhanced neighbor matrix that is based on the wear level. This is based on the fact that the more the overlap between the disk and other disks is, the higher the disk utilization is, and the higher the disk utilization is, the faster the wear level is. That is, reducing the overlap of disks with a high wear level may reduce their utilization and reduce the increase rate of their wear levels.

To this end, in an embodiment of the present disclosure, it is possible to determine an enhanced neighbor matrix characterizing both distribution evenness of the disk extents on the plurality of disks and the wear levels of the plurality of disks, according to conditions of allocated disk extents of the plurality of disks and the wear levels of the plurality of disks, and perform a resource reallocation operation on the plurality of disks based on the enhanced neighbor matrix. In a further embodiment, the I/O load level may be further considered when performing a resource reallocation operation.

Figure 6:
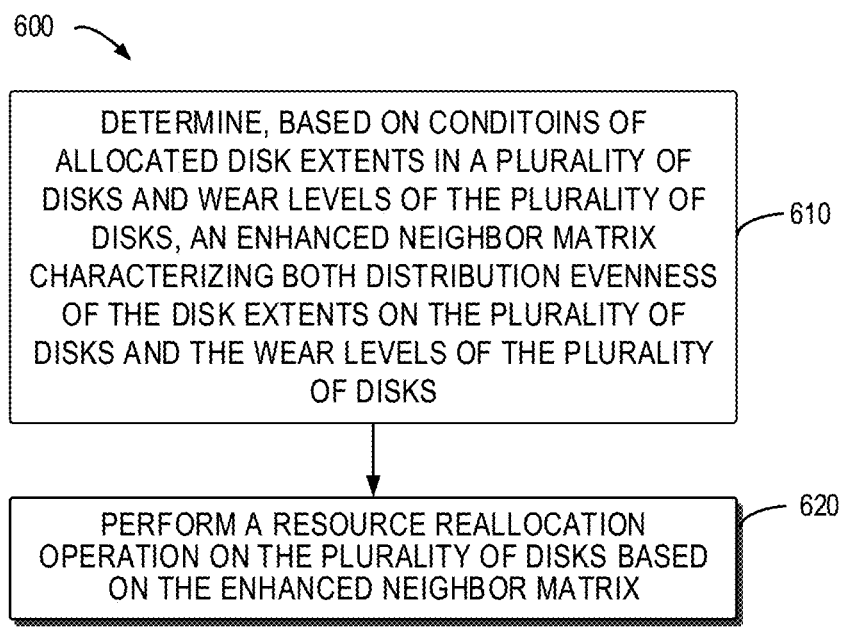
FIG. 6 illustrates a flow chart of a method 600 for performing resource reallocation for a disk system, according to some embodiments of the present disclosure.

FIG. 6 illustrates a flow chart of a method 600 for performing resource reallocation for a disk system according to some embodiments of the present disclosure. As illustrated in FIG. 6, at block 610, an enhanced neighbor matrix, which characterizes both distribution evenness of the disk extents on the plurality of disks and the wear levels of the plurality of disks, is determined according to conditions of the allocated disk extents of the plurality of disks and the wear levels of the plurality of disks.

In an embodiment according to the present disclosure, respective elements of the enhanced neighbor matrix are determined by adjusting respective elements of the original neighbor matrix with weight values. The original neighbor matrix herein characterizes the evenness of distribution of the disk extents on the plurality of disks. The weight value may be determined based on an ideal wear level of the plurality of disks, respective wear levels of respective disk pairs corresponding to respective elements of the original neighbor matrix.

In some embodiments according to the present disclosure, the weight value w is determined as:

$(1+\alpha i/D\_WT\text{ideal})*(1+\alpha j/D\_WT\text{ideal})$

Therefore, the element NM(i,j) in the enhanced neighbor matrix according to an embodiment of the present disclosure may be determined as:

$NM(i,j)=NM'(i,j)*(1+\alpha i/D\_WT\text{ideal})*(1+\alpha j/D\_WT\text{ideal})$:

where NM'(i, j) indicates the original neighbor matrix without considering the wear level.

Next, at block 620, a resource reallocation operation may be performed on the plurality of disks based on the enhanced neighbor matrix. The resource allocation operation based on the enhanced neighbor matrix may be performed in a similar manner according to the resource reallocation operation based on the original neighbor matrix in the prior art. However, since the enhanced neighbor matrix takes into account both the evenness of the distribution of the disk extents and the disk wear level, resource reallocation may be performed more efficiently, thereby reducing the occurrence of the ping-pang operation.

Further, in some embodiments of the present disclosure, the resource reallocation operation may be further performed based on the load level of the disk pairs. In such an embodiment, it is possible to first determine the disk pair corresponding to the maximum value of the elements in the enhanced neighbor matrix, and then, based on the load level of the disk pair, perform the resource reallocation by taking one of the disk pair as the source disk. In the case where there are multiple disk pairs corresponding to the maximum value, the disk pair may be determined based on the following priority:

a disk pair including a disk with a load level in the hot disk area;

a disk pair including a disk with a load level in the cold disk area;

a disk pair including a disk with the highest load level.

That is to say, if there are multiple candidate disk pairs, the disk pair including a hot disk will be preferentially selected; if no hot disk is included, the disk pair including a cold disks will be preferentially selected; in the case that none of disk pairs includes a hot disk or and a cold disk, the disk pair including a disk with the highest load level is selected.

Hereinafter, for the purpose of illustration, some parameters to be used hereinafter will be described first:

$d=\{d_1, d_2, \ldots, d_n\}$: a disk set in the extent pool, n is disk count $D\_T_i$: load temperature of disk i $D\_WT_i$: wear temperature of disk i $DE\_T_{im}$: load temperature of disk extent m in disk i $DE\_WT_{im}$: wear temperature of disk extent m in disk i $D\_C_i$=the number of disk extents of disk i $D\_T_{avg}=\Sigma_{i=1}^{N}D\_T_i/N$: average disk load temperature of all disks $DE\_T_{avg}=\Sigma_{i=1}^{N}D\_T_i/\Sigma_{j=1}^{N}D\_C_j$: average disk extent load temperature of all disk extents $D\_C_{avg}$=the number of disk extents in extent pool/the number of disks: average disk extent count per disk of all disks $D\_WQ_i$=capacity of disk i*remaining PE cycles/remaining hours: write quota of disk i $$D\_WT_{ideal} = \frac{\sum_{i=1}^{n} D\_WT_i * D\_WQ_i}{\sum_{i=1}^{N} D\_WQ_i} : \text{ideal}$$

wear temperature of all disks $NM(i, j) = NM'(i, j)*(1 + \alpha_i/D\_WT_{ideal})*(1 + \alpha_j/D\_WT_{ideal})$:

where NM'(i, j) indicates the original neighbor matrix without considering the wear level, wherein $$\alpha n = \begin{cases} 0, \text{ if } D\_WT_n < D\_WT_{ideal} \\ f(D\_WT_n - D\_WT_{ideal}) \end{cases}, n = i, j$$

where i and j respectively indicate numbers disks of respective disk pairs corresponding to respective elements of the original neighbor matrix;

$D\_WT_{ideal}$ indicates an ideal wear level of the plurality of disks;

D_WTn indicates the ideal wear level of the disk n (n=i, j); and f(x) is a monotonously increasing function, and f(0)=0.

Figure 7:
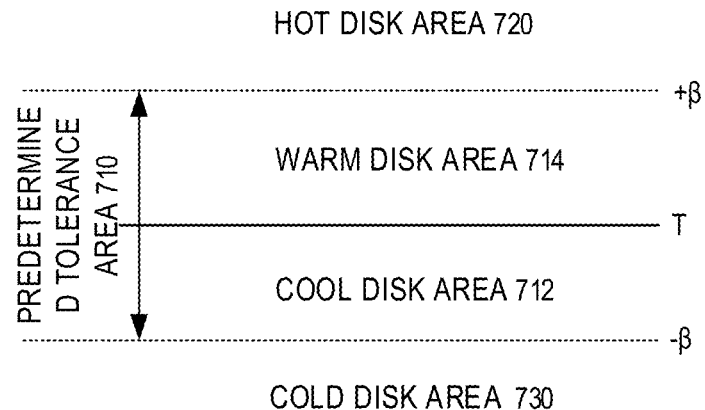
FIG. 7 illustrates an example region division of load temperature levels according to some embodiments of the present disclosure.

Further, in some embodiments according to the present disclosure, it is also possible to divide a load level range of the disk into several areas. FIG. 7 illustrates an example area division of load temperature levels according to some embodiments of the present disclosure. As illustrated in FIG. 7, the temperature T indicates the average temperature or ideal temperature of all the disks, i.e., it may be D_Tavg. β indicates a temperature tolerance factor, 0<β<1, and usually β may assume a value 10%. The area between T−β and T+β becomes a predetermined tolerance area 710. In the predetermined tolerance area, the area above the temperature T is referred to as the warm disk area 712, and the area below the temperature T is referred to as the cold disk area 714. A disk whose load level falls within the warm disk area 712 may be referred to as a warm disk. If the disks i, j are both warm disks and the temperature of the disk i is greater than the disk j, the disk i is warmer than the disk j. A disk whose load level falls within the cool disk area 714 may be referred to as a cool disk. If the disks i and j are both cool disks and the temperature of the disk i is greater than the disk j, the disk i is cooler than the disk j.

An area whose load level is above the predetermined tolerance area 710 is a hot disk area 720. A disk whose load level falls within the hot disk area 720 may be referred to as a hot disk. If both disks i, j are hot disks and the temperature of disk i is greater than disk j, disk i is hotter than disk j. An area below the predetermined tolerance area is a cold disk area 730. A disk whose load level falls within the cold disk area may be referred to as a cold disk. If disks i, j are both cold disks and the temperature of disk i is greater than disk j, disk i is colder than disk j.

In some embodiments according to the present disclosure, the resource reallocation may be performed according to which one(s) of the hot disk area, the cold disk area, the warm disk area and the cool disk area the load levels of two disks in the disk pair corresponding to the maximum value of elements in the enhanced neighbor matrix are located.

Figure 8:
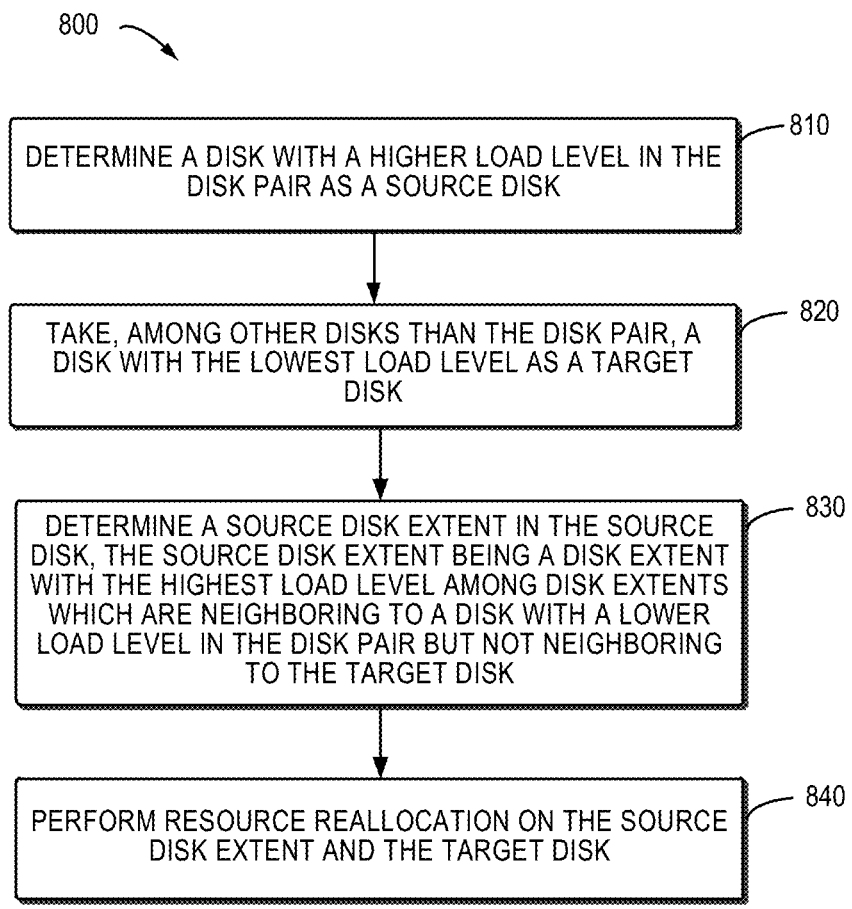
FIG. 8 illustrates an example method 800 of a resource reallocation operation according to some embodiments of the present disclosure.

FIG. 8 illustrates an example method 800 of a resource reallocation operation according to some embodiments of the present disclosure. The method 800 may be performed in the case that a load level of at least one disk in the disk pair is in the hot disk region. As illustrated in FIG. 8, first, at block 810, the disk with the highest load level in the disk pair is determined as the source disk. That is, if the load level of only one disk in the disk pair falls on the hot disk area, the disk that falls in the hot disk area is selected as the source disk; when the load levels of two disks in the disk pair are both in the hot disk area, the disk with the higher load level is selected as the source disk. At block 820, the disk with the lowest load level among other disks than the disk pair is taken as the target disk. Next at block 830, a source disk extent is determined from a disk extent of the source disk, the source disk extent is neighboring to a disk having a lower load level in the disk pair but not neighboring to the target disk, and is the disk extent with the highest load level among all disk extents that meet the standard. Then, at block 840, resource reallocation is performed on the determined source disk extent and the target disk.

Figure 9:
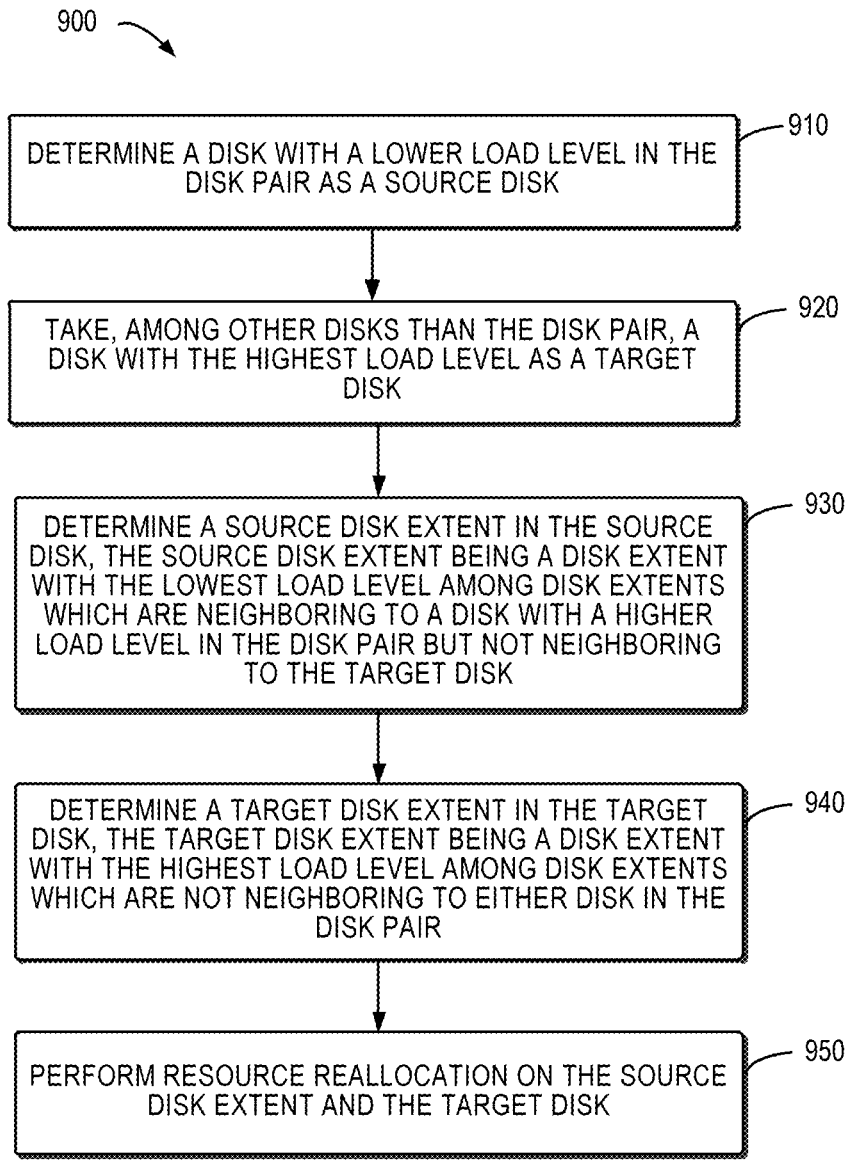
FIG. 9 illustrates an example method 900 of a resource reallocation operation according to some embodiments of the present disclosure.

FIG. 9 illustrates an example method 900 of a resource reallocation operation according to some embodiments of the present disclosure. The method 900 may be performed in the case that a load level of at least one disk in the disk pair is in the cold disk area. As illustrated in FIG. 9, at block 910, the disk with the lower disk load level in the disk pair is taken as the source disk. At block 920, the disk with the highest load level among other disks than the disk pair is taken as the target disk. Next, at block 930, one of the disk extents in the source disk is selected as the source disk extent. The source disk extent should be neighboring to a disk with a higher load level in the disk pair but not neighboring to the target disk, and is the disk extent with the lowest load level among disk extents that meet the standard. Thereafter, at block 940, one of the disk extents in the target disk is further determined as the target disk extent. The target disk extent is not neighboring to disks within the disk pair, and is the disk extent with the highest load level among disk extents that meet the standard. Then, resource reallocation may be performed on the determined source disk extent and the target disk extent.

In the case where the load level of at least one disk in the disk pair is in the warm disk area, processing is also performed according to the flow illustrated in FIG. 8; and in the case that the load level of at least one disk in the disk pair is in the cool disk area, processing may be performed according to the flow illustrated in FIG. 9.

For each of the above cases, there might occur the case that the disk pair includes disks in different temperature areas. In this case, it is possible to face the problem of selecting which process in the processes as illustrated in FIG. 8 and FIG. 9 to perform the processing, and it is possible to select the process for example according to a predetermined priority. Such priority may include: a disk with a load level in the hot disk area and with the higher load level in the disk pair, or a disk with a load level in the cold disk area and with the lower load level in the disk pair; a disk with a load level in the warm disk area and with the higher load level in the disk pair; a disk with a load level in the cool disk area and with the lower load level in the disk pair. That is to say, as long as the disk pair includes a hot disk or a cold disk, the hot disk with the higher load level or the cold disk with the lower load level is selected as the source disk, and then processing is performed according to subsequent steps in the process illustrated in FIG. 8 or FIG. 9. In the case where the disk pair does not include any of the hot disk and the cold disk but includes the warm disk, the warm disk with the higher load level is used as the source disk, and processing is performed according to subsequent steps in the process illustrated in FIG. 8. In the case where the disk pair includes only the cool disk, the cool disk with the lower load level is selected as the source disk, and processing is performed according to subsequent steps in the process illustrated in FIG. 9.

For purposes of illustration, one specific implementation for resource reallocation in accordance with the present disclosure will be described in detail next.

Selection of the Disk Pair

First, for the determined enhanced neighbor matrix NM, disk i and disk j are selected from all elements, where NM(i,j) has the maximum value among respective elements in the neighbor matrix. If there are multiple disk pairs corresponding to the maximum value, i.e., NM (ix, jx) (ix∈D, jx∈D), the disk pair i, j that includes a hot disk is selected. If multiple disk pairs include the hot disk, the disk pair including the hot disk with the highest load level is selected. If there is no hot disk, the disk pair i, j including a cold disk is selected. If multiple disk pairs include the cold disk, the disk pair including the cold disk with the lowest load level is selected. Also, if there is no cold disk either, the disk pair i, j with the highest load temperature is selected. Then, in the subsequent steps, processing is performed according to different conditions of the disk pair.

Case 1: the Disk Pair including a Hot Disk

If at least one of disk i and disk j is a hot disk, the hotter disk in the disk pair is selected as the source disk for the shuffling operation, and it is assumed that disk i is the hotter disk. Then, the coldest disk k is selected as the shuffling target disk (k∈D, but k is not i or j). From the disk i and the disk k, a RAID extent set (RE) is found, wherein each RAID extent (re) in the RE covers the disk i, j but does not cover the disk k, that is, each re in the RE contains the disk i and disk j but does not contain disk k. Next, from the disk i and RE, a source disk extent de_s having the highest load temperature is selected, and de_s∈RE.

If the load temperature of de_s is lower than DE_Tavg, the process returns to the step of reselecting the shuffling target disk k in case 1, and starts the next round of operation to select next coldest disk k', where k'∈D but k' is not i or j. If the shuffling target disk k and the source disk extent de_s are successfully selected, the disk extent de_s is moved to the disk k, and the neighbor matrix and temperature values of the disk i and the disk k are updated.

The operation from selecting the coldest disk as the shuffling target disk to moving the disk extent ds_s may be repeated until the disk i is not a hot disk or NM(i, j) is not the maximum value in the neighbor matrix. At this point, it is possible to return to the initial disk pair selection operation and restart the next round of operations.

Case 2: the Disk Pair including a Cold Disk

If neither disk i nor disk j is a hot disk, but at least one of disk i and disk j is a cold disk, then the colder disk in the disk pair is selected as the source disk for the shuffling operation, and it is assumed that disk i is the colder disk. The hottest disk k is selected as the shuffle target disk (k∈D, but k is not i or j). Form the disk i and the disk k, find a RAID extent set (RE), wherein each RAID extent re belonging to the RE covers the disk i, j but does not cover the disk k; that is, each re in the RE contains the disk i and the disk j but does not contain disk k. Next, from the disk i and RE, the source disk extent de_s having the lowest load temperature is selected, and de_s∈RE. If the load temperature of de_s is higher than DE_Tavg, return to the step of selecting the target shuffling disk in the case 2, and start the next round of operation, thereby selecting the next hottest disk k', where k'∈D but k' is not i or j.

If the shuffling target disk k and the source disk extent de_s are successfully selected, the target disk extent de_d is selected from the target disk k, wherein the RAID disk extent in which the target disk extent de_d is located does not include disk extents of the disk i and disk j, and this target disk extent de_d is the disk extent with the highest load level among all disk extents that satisfy this condition.

If the load temperature of the target disk extent de_d is lower than DE_Tavg or the load temperature of de_s, then return to the step of selecting the target shuffling disk in case 2 to start the next round of operation, thereby selecting next hottest disk k', where k'∈D but k' is not i or j. If the shuffling target disk k, the source disk extent de_s and the target disk extent de_d are successfully selected, data is exchanged between the source disk extent de_s and the target disk extent de_d. The neighbor matrix and the temperature values of disk i and disk k are then updated.

The operation from the step of selecting the hottest disk as the shuffling target disk to the aforementioned exchange of data may be repeated until the disk i is not a cold disk or NM(i, j) is not the maximum number in the neighbor matrix. The process may then return to the initial disk pair selection operation and restart the next round of operation.

Case 3: the Disk Pair including a Warm Disk

If neither of disk i and disk j is a hot disk or a cold disk, but at least one is a warm disk, select the disk with the highest load temperature as the source disk for the shuffling operation, and it is assumed that disk i is a hotter disk. Then, select the coldest disk k as the shuffling target disk (k∈D, but k is not i or j). From disk i and disk k, a RAID extent set (RE) is found, where each RAID extent in the RE covers disk i, j but does not cover disk k. Then, from the disk i and RE, select the source disk extent de_s with the highest load temperature, and de_s∈RE and satisfying the lower limit of the D_Ti−DE_T_s>a predetermined tolerance area to avoid the source disk temperature after resource reallocation from decreasing to a cold disk.

If the load temperature of de_s is lower than DE_Tavg, then return to the step of selecting the target shuffling disk in case 3, start the next round of operation to select the next coldest disk k', where k'∈D but k' is not i or j. If the shuffling target disk k and the source disk extent de_s are successfully selected, the disk extent de_s is moved to disk k, and the neighbor matrix and the temperature values of disk i and disk k are updated.

The operation from selecting the coldest disk as the shuffling target disk to moving the disk extent ds_s may be repeated until the disk i is not a warm disk or NM(i, j) is not the maximum value in the neighbor matrix. At this point, it is possible to return to the initial disk pair selection operation and restart next round of operation.

Case 4: the Disk Pair including Cool Disks

If both disk i and disk j are cool disks, then select the cooler disk in the disk pair as the source disk for the shuffling operation, and it is assumed disk i is the cooler disk. The hottest disk k is selected as the shuffle target disk (k∈D, but k is not i or j). Then, from the disk i and the disk k, the RAID extent set RE is found, wherein each RAID extent re belonging to the RE covers the disks i, j but does not covers the disk k. Next, from the disk i and RE, the source disk extent de_s having the lowest load temperature is selected, and de_s∈RE. If the load temperature of de_s is higher than DE_Tavg, return to the step of selecting the target shuffling disk in case 4, and start next round of operation, thereby selecting the next hottest disk k', where k'∈D but k' is not i or j.

If the shuffling target disk k and the source disk extent de_s are successfully selected, the target disk extent de_d is selected from the target disk k, wherein the RAID disk extent in which the target disk extent de_d is located does not include disk extents of the disk i and disk j, and this disk extent de_d is a disk extent with the highest load level among all disk extents that satisfy this condition.

If the load temperature of the target disk extent de_d is lower than DE_Tavg or the load temperature of de_s, return to the step of selecting the target shuffle disk in case 4 to start the next round of operation, thereby selecting the next hottest disk k', where k'∈D but k' is not i or j. If the shuffling target disk k, the source disk extent de_s, and the target disk extent de_d are successfully selected, data exchange is performed between the source disk extent de_s and the target disk extent de_d. The neighbor matrix and the temperature value of disk i and disk k are then updated.

The operation from the step of selecting the hottest disk as the shuffling target disk to the aforementioned exchange of data may be repeated until the disk i is not a cold disk or NM(i, j) is not the maximum number in the neighbor matrix. Then, it is possible to return to the initial disk pair selection operation and restart next round of operation.

If there is still a hot or cold disk after several times of operations, the balance request for balancing the hot or cold disk at the slice granularity may be sent to the fine-grained load balancing module.

FIG. 10A to FIG. 10E illustrate an example shuffling process for a resource reallocation method for an extent pool of 10 disks, in accordance with an embodiment of the present disclosure, and additionally show the original NM matrix, enhanced NM matrix, disk extent distribution, and load temperature corresponding to each intermediate process.

Figure 10A:
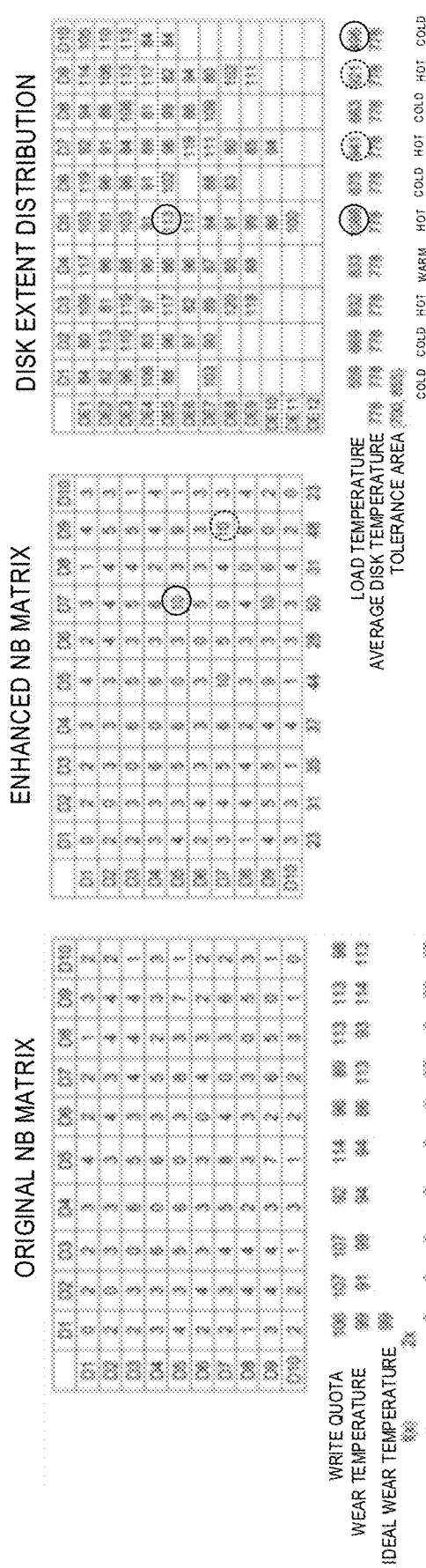
Figure 10B:
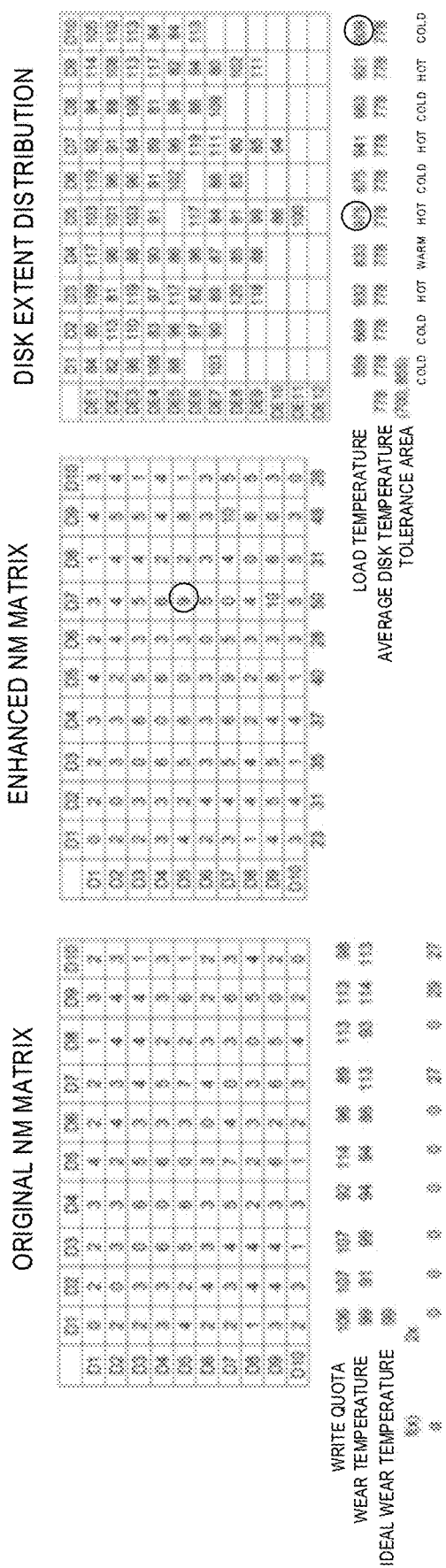

As illustrated in FIG. 10A, the disk 5 and the disk 7 corresponding to the NM (5, 7) having the maximum value of 10 in the enhanced neighbor matrix are first taken as a disk pair, and the disk 5 is selected as the shuffling source disk. Although the NM (7, 9) in the enhanced NM matrix also has a maximum value, the disk pairs 5, 7 is a disk pair containing the hot disk having the highest load temperature. Next, according to the foregoing case 1, the coldest disk 10 is selected as the shuffling target disk. Then, the hottest disk extent 5 of the disk 5 is selected as the shuffling source disk section, which is neighboring to the disk 7, but not neighboring to the disk 10. The disk extent 5 of disk 5 is then moved to disk 10 and the neighbor matrix and disk temperature are updated. FIG. 10B shows a result after the resource reallocation operation at this time. The operation for the magnetic disk 5 is continued in accordance with the foregoing case 1 until an internal state illustrated in FIG. 10C may be obtained.

Figure 10C:
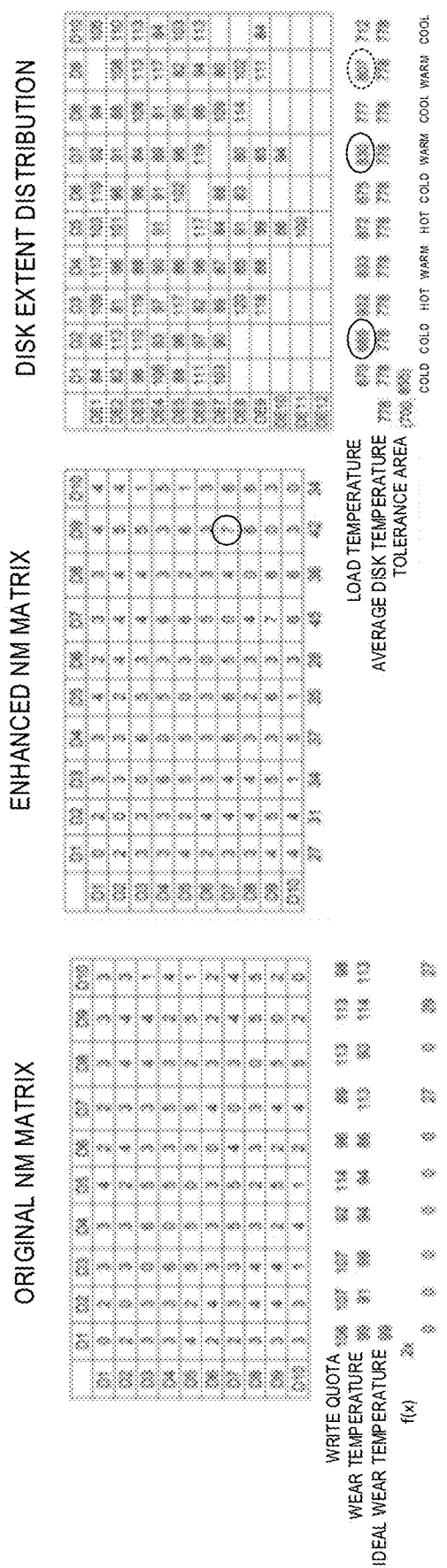
Figure 10D:
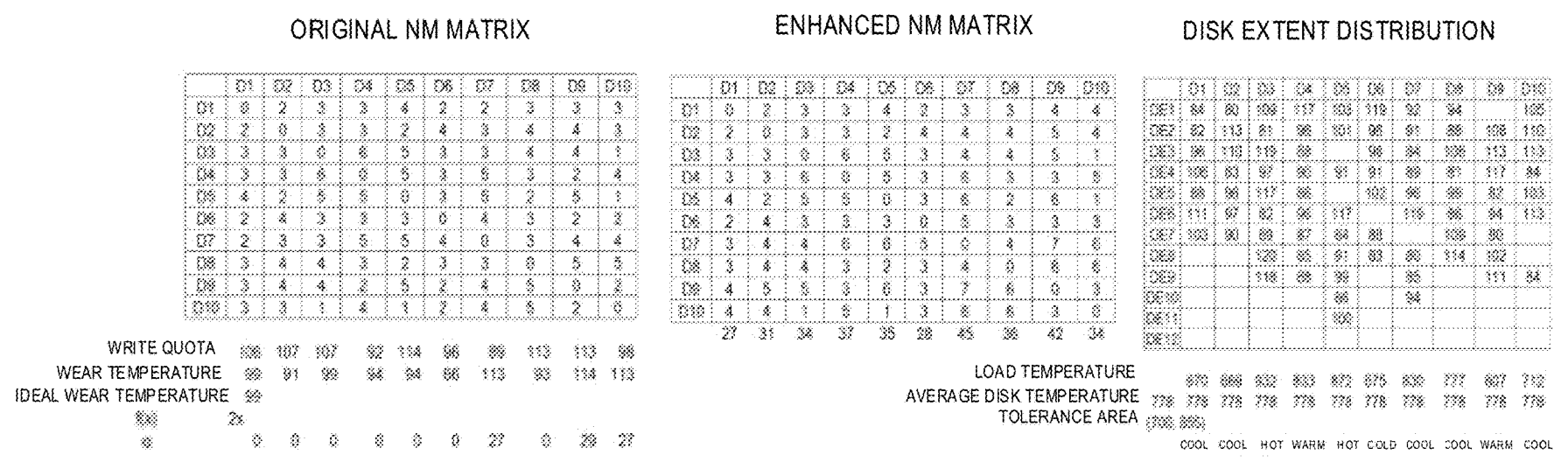

In the state illustrated in FIG. 10C, it may be found that NM (7, 9) is the maximum value. But both disk 7 and disk 9 are warm disks. Therefore, according to the foregoing case 3, the warm disk 7 is selected as the shuffling source disk, the coldest disk 2 is selected as the shuffling target disk, and the disk extent 5 is selected as the shuffling source disk extent. The disk extent 5 of the disk 7 is then moved to the disk 2 and the neighbor matrix and disk temperature are updated. FIG. 10D shows a result after this resource reallocation operation.

Figure 10E:
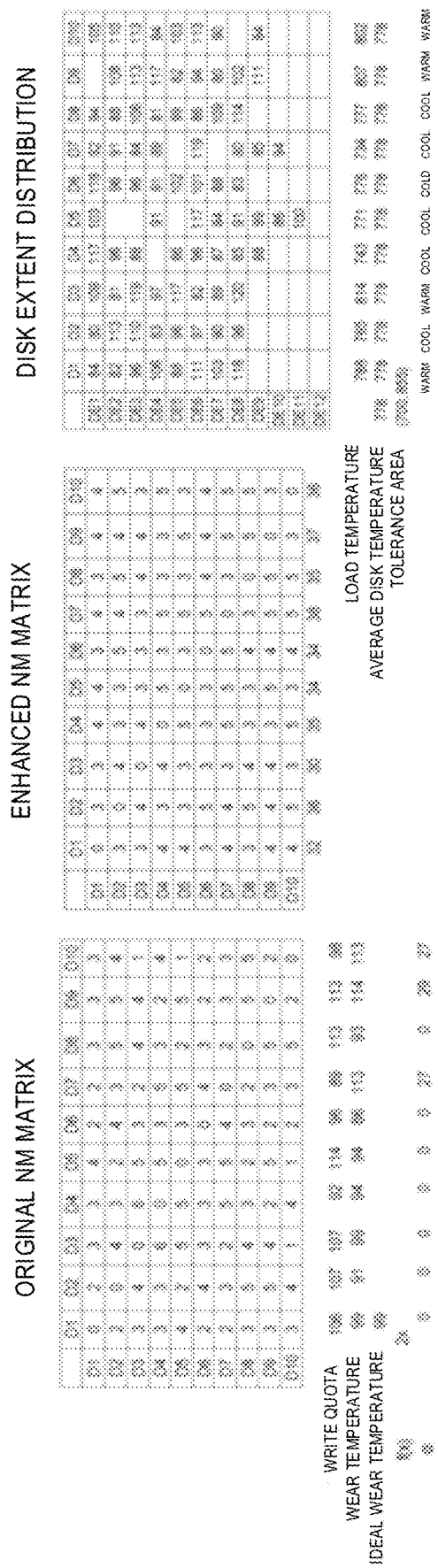
Figure 11:
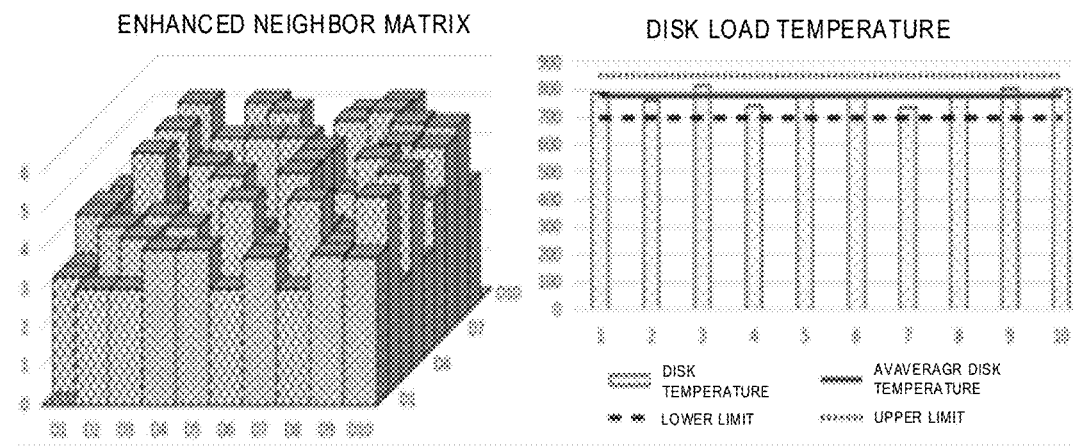
FIG. 11 illustrates a diagram of neighborhood matrix and load temperature obtained after the load balancing operation of FIG. 10E, according to some embodiments of the present disclosure.

The final result of continuous resource allocation for the disk is illustrated in FIG. 10E. FIG. 11 shows a schematic diagram of the corresponding enhanced neighbor matrix and disk temperature. It may be seen from the figure that the distribution evenness of the disk extent and the disk temperature distribution may obtain relatively good results.

In embodiments of the present disclosure, the disk extent movement in the intersection of the solution spaces of the above various operations is considered in performing the resource reallocation operation. Therefore, although it is necessary to meet the constraints of the intersection, this method may ensure improvement of the shuffling operation or the load balancing operation instead of being deteriorated.

Therefore, resource reallocation according to the scheme within the intersection within the solution spaces may have less available disk extent movement compared with the solution of separately performing the shuffling operation and the load balancing operation. In the existing shuffling operation, even if the calculated disk extent movement causes the hot disk to be hotter, movement is directly performed in the current implementation without considering the disk load. However, in the embodiment of the present disclosure, such a disk extent is not moved. That is, when the resource reallocation method of the present disclosure is completed, there may still be one or more disk extents that may be reallocated to further improve the evenness of the disk extent allocation. These re-locatable disk extents are just the reasons causing the ping-pang movement between the original shuffling operation and the load balancing operation. Thus, from this point of view, the result of the resource reallocation operation of embodiments of the present invention is actually a good tradeoff between disk extent distribution and load balancing. Therefore, the resource reallocation operation of the embodiment of the present disclosure may also called as a load balancing shuffling operation.

These re-locatable disk extents may be further processed by means of a fine-grained load balancing technology. That is, the fine-grained load balancing technique may be utilized to reallocate the slices of the unbalanced disk after the above operations are completed. Therefore, the method uses the enhanced neighbor matrix as the main reference, and always makes the neighbor matrix even, and the remaining imbalance problem may be left to the fine-grained load balancing module for processing. Since in the prior art, the residual imbalance after load balancing is also solved by the fine-grained load balancing module, this does not impose an additional burden on the work of fine-grained load balancing.

Therefore, the resource reallocation operation in accordance with embodiments of the present disclosure may avoid the disk extent ping-pang reallocation between the original shuffling operation and load balancing operation. By using the resource reallocation operation of embodiments of the present disclosure, the background operations for disk extent reallocation may be reduced from the previous three to even one. The less background operations mean a lower computational cost. Moreover, in the current storage system, the resource reallocation operation of the embodiments of the present disclosure may be easily implemented, and only the corresponding algorithm needs to be updated. Therefore, it has better compatibility.

Figure 12:
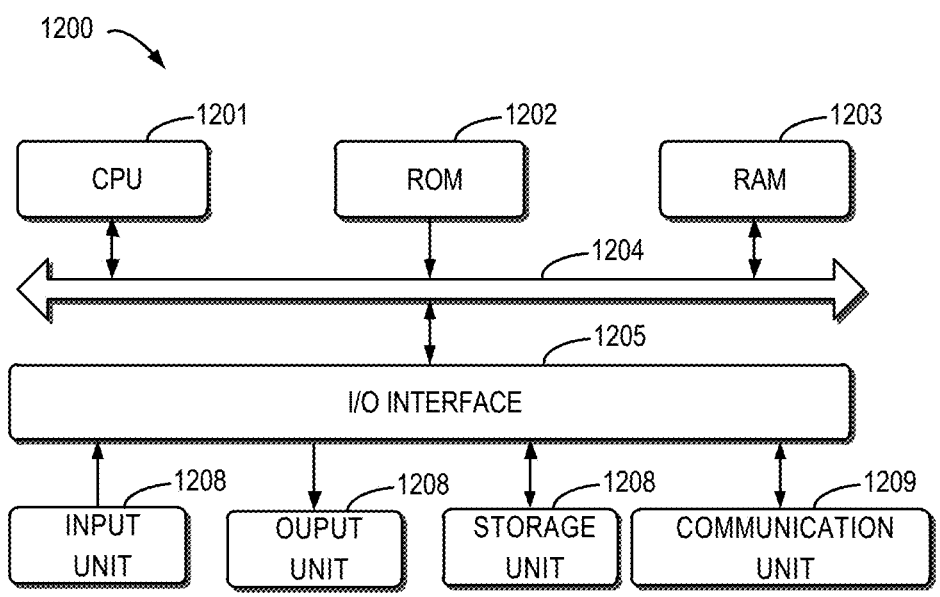
FIG. 12 illustrates a schematic block diagram of an example device 1200 that may be used to implement embodiments of the present disclosure.

In addition, FIG. 12 illustrates a schematic block diagram of an example device 1200 that may be used to implement embodiments of the present disclosure. The device 1200 may be used to implement one or more control modules of a storage controller 110 of FIG. 1.

As shown, the device 1200 includes a central processing unit (CPU) 1201 which is capable of performing various processes in accordance with computer program instructions stored in a read only memory (ROM) 1202 or computer program instructions loaded from a storage unit 1208 to a random access memory (RAM) 1203. In the RAM 1203 are stored various programs and data as required by operation of the device 1200. The CPU 1210, the ROM 1202 and the RAM 1203 are connected to one another via a bus 1204. An input/output (I/O) interface 1205 is also connected to the bus 1204.

Connected to the I/O interface 1205 are components in the device 1200 including: an input unit 1206, such as a keyboard, a mouse, or the like; an output unit 1207 such as various types of displays and speakers; a storage unit 1208 such as a magnetic disk, optical disk or the like; and a communication unit 1209 such as a network card, a modem, a wireless communication transceiver or the like. The communication unit 1209 allows the device 1200 to exchange information/data with other devices via a computer network such as the Internet and/or various telecommunication networks.

The processing unit 1201 performs various method and processes described above, for example any one of method 500, method 600, method 700, the process in FIG. 10 and the process of FIG. 11. For example, in some embodiments, any one of method 500, method 600, method 700, the process in FIG. 10 and the process of FIG. 11 may be implemented as a computer software program or computer program product, which is tangibly contained in a machine-readable medium, for example the storage unit 1208. In some embodiments, a part or all of the computer programs may be loaded and/or installed on the device 1200 via ROM 1202 and/or communication unit 1209. When the computer program is loaded in the RAM 1203 and executed by CPU 1201, one or more steps of any one of method 500, method 600, method 700, the process in FIG. 10 and the process of FIG. 11 described above may be executed. Alternatively, in other embodiments, the CPU 1201 may be configured to perform any one of method 500, method 600, method 700, the process in FIG. 10 and the process of FIG. 11 in any other suitable manner (e.g., by means of firmware).

It will be understood by those skilled in the art that various steps of the above-described methods of the present disclosure may be implemented by a general-purpose computing device, and they may be centralized on a single computing device or distributed over a network of multiple computing devices. Alternatively, they may be implemented by a program code executable by the computing device so that they may be stored in the storage device and executed by the computing device, or by fabricating them into individual integrated circuit modules, or fabricating multiple modules or steps thereof into a single integrated circuit module. Thus, the present disclosure is not limited to any specific combination of hardware and software.

It should be appreciated that although several means or sub-means of the device (e.g., specialized circuitry) are mentioned in the above detailed description, such division is merely an example and not mandatory. In fact, according to embodiments of the present disclosure, features and functions of two or more means described above may be embodied in one means. Conversely, the feature and function of one means described above may be further divided and embodied by multiple means.

Embodiments described above are only some optional embodiments of the present disclosure, and are not intended to limit the present disclosure; those skilled in the art appreciate that various changes and modifications may be made to the present disclosure. Any modifications, equivalent substitutions, improvements, etc., made within the spirit and scope of the present disclosure, are intended to be contained within the scope of the present disclosure.

We claim:

1. A method for performing resource reallocation for a disk system, comprising:
    determining, based on conditions of allocated disk extents in a plurality of disks and wear levels of the plurality of disks, an enhanced neighbor matrix characterizing both distribution evenness of the disk extents on the plurality of disks and the wear levels of the plurality of disks; and
    performing a resource reallocation operation on the plurality of disks based on the enhanced neighbor matrix;
    wherein the determining the enhanced neighbor matrix comprises:
        determining respective elements of the enhanced neighbor matrix by adjusting respective elements of an original neighbor matrix using a weight value,
    wherein the original neighbor matrix characterizes evenness of distribution of the disk extents on the plurality of disks,
    wherein the weight value is determined based on an ideal wear level of the plurality of disks and respective wear levels of respective disk pairs corresponding to respective elements of the original neighbor matrix, and
    wherein the weight value is determined as:

$(1+\alpha_i/D\_WT\text{ideal})*(1+\alpha_j/D\_WT\text{ideal})$ where $$\alpha_n = \alpha n = \begin{cases} 0, \text{ if } D\_WT_n < D\_WT_{ideal} \\ f(D\_WT_n - D\_WT_{ideal}) \end{cases}, n = i, j$$

i and j respectively indicate numbers of disks of respective disk pairs corresponding to respective elements of the original neighbor matrix;
    $D\_WT_{ideal}$ indicates the ideal wear level of the plurality of disks;
    $D\_WT_n$ indicates an ideal wear level of disk n; and
    f(x) is a monotonously increasing function, and f(0)=0.

2. The method of claim 1, wherein the performing resource reallocation operation on the plurality of disks based on the enhanced neighbor matrix comprises:
    determining a disk pair corresponding to a maximum value of elements in the enhanced neighbor matrix; and
    performing resource reallocation by taking one disk in the disk pair as a source disk, based on the load level of the disk pair.

3. The method of claim 2, wherein the load level is divided into a predetermined tolerance area, a hot disk area above the predetermined tolerance area, and a cold disk area below the predetermined tolerance area,
    wherein the predetermined tolerance area is further divided into a warm disk area above a predetermined load level and a cool disk area below the predetermined load level, and
    wherein the resource reallocation is performed based on which one or ones of the hot disk area, the cold disk area, the warm disk area and the cool disk area the load levels of two disks in the disk pair are located in.

4. The method of claim 3, wherein the determining the disk pair corresponding to a maximum value of elements in the enhanced neighbor matrix comprises:
    in a case where there are a plurality of disk pairs corresponding to the maximum value, determining the disk pair according to the following priority:
    a disk pair including a disk with a load level in the hot disk area;
    a disk pair including a disk with a load level in the cold disk area; and
    a disk pair including a disk with the highest load level.

5. The method of claim 3, wherein the performing resource reallocation on one disk in the disk pair based on the load level of the disk pair comprises:
    in response to determining that the load level of at least one disk in the disk pair is in the hot disk area,
    determining a disk with a higher load level in the disk pair as a source disk,
    taking, among other disks than the disk pair, a disk with the lowest load level as a target disk,
    determining a source disk extent in the source disk, the source disk extent being a disk extent with the highest load level among disk extents which are neighboring to a disk with a lower load level in the disk pair but not neighboring to the target disk; and
    performing resource reallocation on the source disk extent and the target disk.

6. The method of claim 3, wherein the performing resource reallocation on one disk in the disk pair based on the load level of the disk pair comprises:
    in response to determining that the load level of at least one disk in the disk pairs is in the cold disk area,
    determining a disk with a lower load level in the disk pair as a source disk,
    taking, among other disks than the disk pair, a disk with the highest load level as a target disk,
    determining a source disk extent in the source disk, the source disk extent being a disk extent with the lowest load level among disk extents which are neighboring to a disk with a higher load level in the disk pair but not neighboring to the target disk;
    determining a target disk extent in the target disk, the target disk extent being a disk extent with the highest load level among disk extents which are not neighboring to either disk in the disk pair; and
    performing resource reallocation on the source disk extent and the target disk.

7. The method of claim 2, wherein the performing resource reallocation on one disk in the disk pair based on the load level of the disk pair comprises:
    in response to determining that the load level of at least one disk in the disk pair is in the warm disk area,
    determining a disk with a higher load level in the disk pair as a source disk,
    taking, among other disks than the disk pair, a disk with the lowest load level as a target disk, determining a source disk extent in the source disk, the source disk extent being a disk extent with the highest load level among disk extents which are neighboring to a disk with a lower load level in the disk pair but not neighboring to the target disk; and performing resource reallocation on the source disk extent and the target disk.

8. The method of claim 2, wherein the performing resource reallocation on one disk in the disk pair based on the load level of the disk pair comprises:

in response to determining that the load level of at least one disk in the disk pairs is in the cool disk area, determining a disk with a lower load level in the disk pair as a source disk, taking, among other disks than the disk pair, a disk with the highest load level as a target disk, determining a source disk extent in the source disk, wherein the source disk extent is a disk extent with the lowest load level among disk extents which are neighboring to a disk with a higher load level in the disk pair but not neighboring to the target disk;

determining a target disk extent in the target disk, wherein the target disk extent is a disk extent with the highest load level among disk extents which are not neighboring to either disk in the disk pair; and performing resource reallocation on the source disk extent and the target disk.

9. The method of claim 8, wherein the source disk is determined according to the following priority:

a disk with a load level in the hot disk area and with a higher load level in the disk pair, or a disk with a load level in the cold disk area and with the lower load level in the disk pair;

a disk with a load level in the warm disk area and with a higher load level in the disk pair; and a disk with a load level in the cool disk area and with a lower load level in the disk pair.

10. The method of claim 1, wherein, for a particular disk pair, a load level of a first disk of the particular disk pair is different from a load level of a second disk of the particular disk pair enabling the first disk to reside in a hot disk region while the second disk does not reside in the hot disk region and allowing the first disk to be selected as a source disk over the second disk.

11. The method of claim 1, wherein determining the enhanced neighbor matrix comprises:

providing, as at least a portion of the respective elements in the enhanced neighbor matrix, matrix values wherein each matrix value is based on a number of times that disk extents of two disks are in a same Redundant Array of Independent Drives (RAID) extent.

12. An apparatus for performing resource reallocation on a disk system, comprising:

a processor; and a memory coupled to the processor, the memory having instructions stored therein, which, when executed by the processor, causes the apparatus to:

determine, based on conditions of allocated disk extents in a plurality of disks and wear levels of the plurality of disks, an enhanced neighbor matrix characterizing both distribution evenness of the disk extents on the plurality of disks and the wear levels of the plurality of disks; and performing a resource reallocation operation on the plurality of disks based on the enhanced neighbor matrix;

wherein the determining the enhanced neighbor matrix comprises:

determining respective elements of the enhanced neighbor matrix by adjusting respective elements of an original neighbor matrix using a weight value, wherein the original neighbor matrix characterizes evenness of distribution of the disk extents on the plurality of disks, wherein the weight value is determined based on an ideal wear level of the plurality of disks and respective wear levels of respective disk pairs corresponding to respective elements of the original neighbor matrix, and wherein the weight value is determined as:

$$(1+\alpha_i/D\_WT_{ideal})*(1+\alpha_j/D\_WT_{ideal})$$

where $$\alpha_n = \begin{cases} 0, \text{ if } D\_WT_n < D\_WT_{ideal} \\ f(D\_WT_n - D\_WT_{ideal}) \end{cases}, n = i, \text{ or } j;$$

i and j respectively indicate numbers of disks of respective disk pairs corresponding to respective elements of the original neighbor matrix;

$D\_WT_{ideal}$ indicates the ideal wear level of the plurality of disks;

$D\_WT_n$ indicates an ideal wear level of disk n; and f(x) is a monotonously increasing function, and f(0)=0.

13. The apparatus of claim 12, wherein the performing resource reallocation operation on the plurality of disks based on the enhanced neighbor matrix comprises:

determining a disk pair corresponding to a maximum value of elements in the enhanced neighbor matrix; and performing resource reallocation by taking one disk in the disk pair as a source disk, based on the load level of the disk pair.

14. The apparatus of claim 13, wherein the load level is divided into a predetermined tolerance area, a hot disk area above the predetermined tolerance area, and a cold disk area below the predetermined tolerance area, wherein the predetermined tolerance area is further divided into a warm disk area above a predetermined load level and a cool disk area below the predetermined load level, and wherein performing the resource reallocation is determined based on which one or ones of the hot disk area, the cold disk area, the warm disk area and the cool disk area the load levels of two disks in the disk pair are located in.

15. The apparatus of claim 14, wherein the performing resource reallocation on one disk in the disk pair based on the load level of the disk pair comprises:

in response to determining that the load level of at least one disk in the disk pair is in the hot disk area, determining a disk with a higher load level in the disk pair as a source disk, taking, among other disks than the disk pair, a disk with the lowest load level as a target disk, determining a source disk extent in the source disk, the source disk extent being a disk extent with the highest load level among disk extents which are neighboring to a disk with a lower load level in the disk pair but not neighboring to the target disk; and performing resource reallocation on the source disk extent and the target disk.

16. The apparatus of claim 13, wherein the determining the disk pair corresponding to a maximum value of elements in the enhanced neighbor matrix comprises:
  in a case where there are a plurality of disk pairs corresponding to the maximum value, determining the disk pair according to the following priority:
  a disk pair including a disk with a load level in the hot disk area;
  a disk pair including a disk with a load level in the cold disk area; and
  a disk pair including a disk with the highest load level.

17. The apparatus of claim 14, wherein the performing resource reallocation on one disk in the disk pair based on the load level of the disk pair comprises:
  in response to determining that the load level of at least one disk in the disk pairs is in the cold disk area,
  determining a disk with a lower load level in the disk pair as a source disk,
  taking, among other disks than the disk pair, a disk with the highest load level as a target disk,
  determining a source disk extent in the source disk, the source disk extent being a disk extent with the lowest load level among disk extents which are neighboring to a disk with a higher load level in the disk pair but not neighboring to the target disk;
  determining a target disk extent in the target disk, the target disk extent being a disk extent with the highest load level among disk extents which are not neighboring to either disk in the disk pair; and
  performing resource reallocation on the source disk extent and the target disk.

18. The apparatus of claim 14, wherein the performing resource reallocation on one disk in the disk pair based on the load level of the disk pair comprises:
  in response to determining that the load level of at least one disk in the disk pair is in the warm disk area,
  determining a disk with a higher load level in the disk pair as a source disk,
  taking, among other disks than the disk pair, a disk with the lowest load level as a target disk,
  determining a source disk extent in the source disk, the source disk extent being a disk extent with the highest load level among disk extents which are neighboring to a disk with a lower load level in the disk pair but not neighboring to the target disk; and
  performing resource reallocation on the source disk extent and the target disk.

19. The apparatus of claim 14, wherein the performing resource reallocation on one disk in the disk pair based on the load level of the disk pair comprises:
  in response to determining that the load level of at least one disk in the disk pairs is in the cool disk area,
  determining a disk with a lower load level in the disk pair as a source disk,
  taking, among other disks than the disk pair, a disk with the highest load level as a target disk,
  determining a source disk extent in the source disk, wherein the source disk extent is a disk extent with the lowest load level among disk extents which are neighboring to a disk with a higher load level in the disk pair but not neighboring to the target disk;
  determining a target disk extent in the target disk, wherein the target disk extent is a disk extent with the highest load level among disk extents which are not neighboring to either disk in the disk pair; and
  performing resource reallocation on the source disk extent and the target disk.

20. The apparatus of claim 19, wherein the source disk is determined according to the following priority:
  a disk with a load level in the hot disk area and with a higher load level in the disk pair, or a disk with a load level in the cold disk area and with the lowest load level in the disk pair;
  a disk with a load level in the warm disk area and with a higher load level in the disk pair; and
  a disk with a load level in the cool disk area and with a lower load level in the disk pair.

21. The apparatus of claim 12, wherein, for a particular disk pair, a load level of a first disk of the particular disk pair is different from a load level of a second disk of the particular disk pair enabling the first disk to reside in a hot disk region while the second disk does not reside in the hot disk region and allowing the first disk to be selected as a source disk over the second disk.

22. The apparatus of claim 12, wherein the apparatus, when determining the enhanced neighbor matrix, is constructed and arranged to:
  provide, as at least a portion of the respective elements in the enhanced neighbor matrix, matrix values wherein each matrix value is based on a number of times that disk extents of two disks are in a same Redundant Array of Independent Drives (RAID) extent.

23. A computer program product having a non-transitory computer readable medium which stores a set of instructions to perform resource reallocation for a disk system; the set of instructions, when carried out by computerized circuitry, causing the computerized circuitry to perform a method of:
  determining, based on conditions of allocated disk extents in a plurality of disks and wear levels of the plurality of disks, an enhanced neighbor matrix characterizing both distribution evenness of the disk extents on the plurality of disks and the wear levels of the plurality of disks; and
  performing a resource reallocation operation on the plurality of disks based on the enhanced neighbor matrix;
  wherein the determining the enhanced neighbor matrix comprises:
    determining respective elements of the enhanced neighbor matrix by adjusting respective elements of an original neighbor matrix using a weight value,
    wherein the original neighbor matrix characterizes evenness of distribution of the disk extents on the plurality of disks,
    wherein the weight value is determined based on an ideal wear level of the plurality of disks and respective wear levels of respective disk pairs corresponding to respective elements of the original neighbor matrix, and
    wherein the weight value is determined as:

$$(1+\alpha_i/D\_WT_{ideal})*(1+\alpha_j/D\_WT_{ideal})$$

where $$\alpha_n = \alpha n = \begin{cases} 0, \text{ if } D\_WT_n < D\_WT_{ideal} \\ f(D\_WT_n - D\_WT_{ideal}) \end{cases}, n = i, j$$

i and j respectively indicate numbers of disks of respective disk pairs corresponding to respective elements of the original neighbor matrix;
  $D\_WT_{ideal}$ indicates the ideal wear level of the plurality of disks;
  $D\_WT_n$ indicates an ideal wear level of disk n; and
  f(x) is a monotonously increasing function, and f(0)=0.

24. The computer program product of claim 23, wherein, for a particular disk pair, a load level of a first disk of the particular disk pair is different from a load level of a second disk of the particular disk pair enabling the first disk to reside in a hot disk region while the second disk does not reside in the hot disk region and allowing the first disk to be selected as a source disk over the second disk.

25. The computer program product of claim 23, wherein determining the enhanced neighbor matrix comprises:
provim, as at least a portion of the respective elements in the enhanced neighbor matrix, matrix values wherein each matrix value is based on a number of times that disk extents of two disks are in a same Redundant Array of Independent Drives (RAID) extent.

\* \* \* \* \*